Patented Feb. 12, 1935

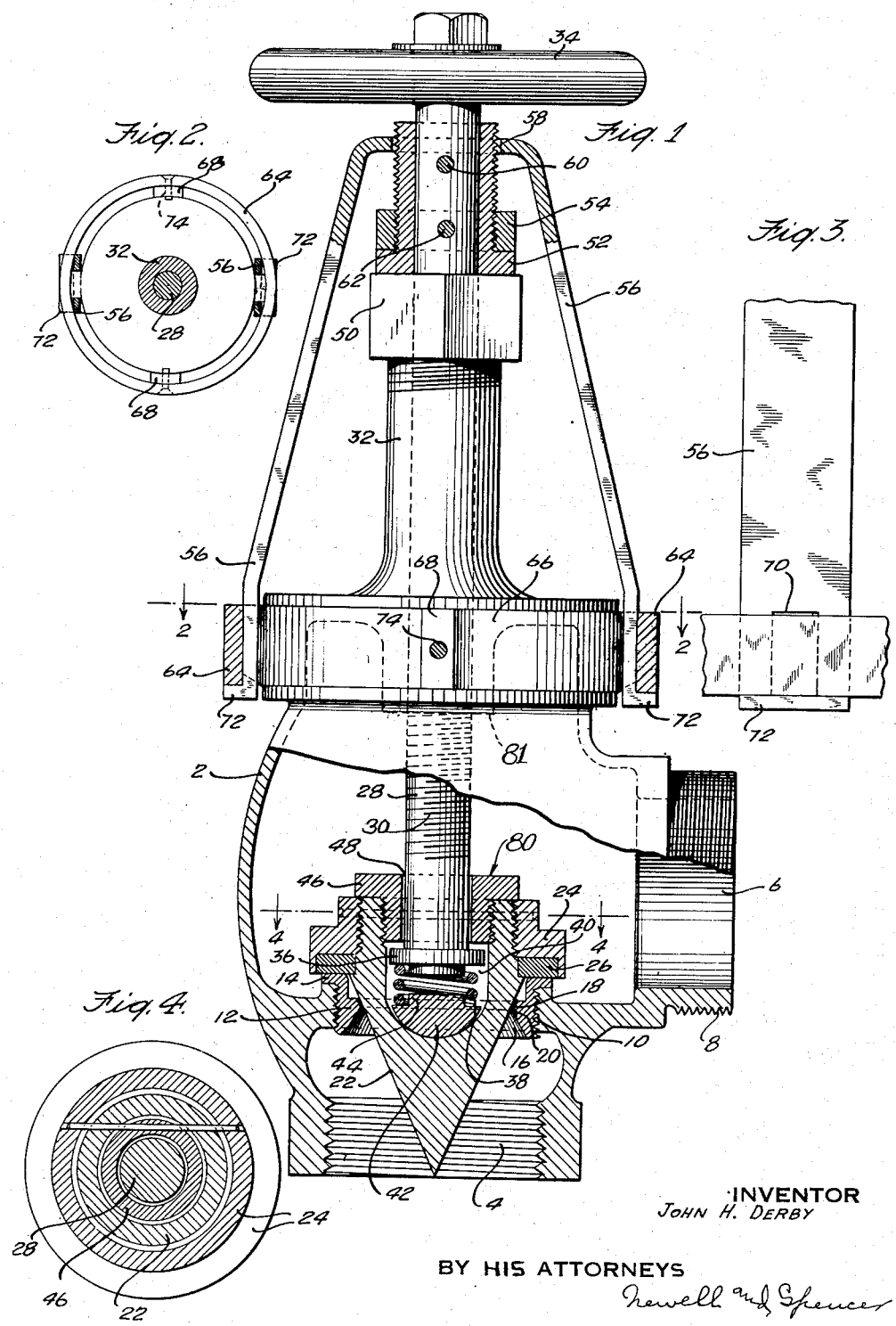

1,991,052

UNITED STATES PATENT OFFICE 1,991,052

COMBINED HOSE AND REDUCING VALVE

John H. Derby, Scarsdale, N. Y.

Application June 13, 1931, Serial No. 544,131

4 Claims. (Cl. 251—154)

This invention relates to valves, and particularly to valves such as are used in fire prevention systems to control the water flow to connections for the attachment of hose.

An object of the invention is to provide a combined hose and reducing valve which is so constructed that it is prevented from opening in ordinary use to dangerous limits but yet can readily be opened by those familiar with the valve to give maximum flow and pressure when occasion for such opening arises.

Other objects and important features of the invention will appear from the following description and claims when considered in connection with the accompanying drawing in which—

Figure 1 is a vertical elevation, partly in section, of a combined hose and reducing valve embodying the present invention;

Figure 2 is a section on the line 2—2 of Figure 1 drawn to a somewhat smaller scale;

Figure 3 is a detail side elevation showing the manner of connecting the stop yoke to the valve housing, and Figure 4 is a section on the line 4—4 of Figure 1.

In the illustrative embodiment of the invention, the housing 2 of the valve is shown as provided with a threaded inlet 4 for attachment to the standpipe or other water supply pipe and with an outlet 6 threaded at 8 to provide a hose bib or coupling.

The housing 2 has another internally threaded part 10, constituting an inner extension of the inlet, into which the ring 12 carrying the valve seat 14, formed upon a flange of the ring 12, is screwed. The interior of the ring 12 is preferably shaped as shown in Figure 1 so that it presents two frusto conical surfaces 16 and 18 intersecting to form an edge 20, where the inner diameter of the ring is smallest. Cooperating with the frusto conical surface 18, to vary the amount of opening provided for the discharge of water into the housing 2, is a cone 22. The cone 22 is coaxial with the frusto conical surface 18 and is movable axially in and out of the ring 12 preferably so that its outer surface is always parallel to the surface 18.

The cone 22 is shown as carried by the valve gland 24 which is provided with suitable valve packing 26 for engaging the valve seat 14 to shut off the water flow, the cone 22 being shown as threaded at its upper end and screwed into the gland 24. To effect the movement of the valve into its open or into its closed position, a valve stem 28 is preferably provided which extends to the outside of the housing 2 and is preferably threaded, as shown at 30, to engage corresponding threads in the neck 32 of the housing 2 whereby when the stem is turned by its hand wheel 34 it may be moved up and down in the housing 2 to effect the opening and closing movements of the valve and therewith also the movement of the cone 22 outward and inward in the ring 12.

The connection between the stem 28 and the valve gland 24 and its connected cone 22 is preferably a lost motion connection for purposes more fully explained in my co-pending application in which said construction is claimed. As herein shown, the stem 28 is provided with a flange 36 near its lower end which provides a shoulder against which bears a spring 38 that serves to hold the valve in its closed condition during a part of the movement of the stem in its valve-opening direction and, vice versa, permits a further movement of the stem in its valve closing direction after the valve has been brought into effective engagement with the seat 14.

The shouldered lower end of the stem 28 is received in the recess 40 in the cone 32, said recess having a rounded bottom with which engages a rocker member 42 having a curve of somewhat smaller diameter, the rocker member 42 having a cylindrical part 44 about which the lower end of the spring 38 engages, the construction described insuring the proper seating of the valve.

A shouldered bushing 46 screwed into the threaded upper portion of the recess 40 in the cone 22 confines the flanged end of the stem 28 in the recess 40, the stem-receiving opening 48 through the bushing 46 being somewhat larger in diameter than the stem 28 to permit a limited rocking movement of the cone 22 and valve gland 24 and connected valve packing 26 on the stem 28 as these parts are moved between their open and closed positions.

The parts are preferably so adjusted that when the valve is in its closed condition the outer surface of the cone 22 does not quite engage the conical surface 18 of the ring 12, the purpose of the cone being not to serve as a valve but as an element of a reducing means.

From the foregoing description it will be seen that opening of the valve by movement of the stem 28 upwardly in the housing 2 does not at once open the inlet into the housing to its full dimensions since the cone 22 projects into the opening and its outer movement only very gradually enlarges the discharge space between it and the conical surface 18 on the interior of the ring 12. Provision is made, however, for sufficient movement of the cone 22 practically to free the inlet opening of resistance to flow of water therethrough. To prevent such movement when the high pressure is not needed and when the flow produced thereby might cause damage provision is preferably made for normally limiting the outward movement of the stem 28 and with it the cone 22 to an extent that will not permit excessive flow or excessive pressure on hose that may be coupled to the housing 2.

In the illustrative embodiment of the invention, the stem 28 is preferably provided above the gland 50, which is threaded upon the neck 32 of the housing 2, with a collar 52 provided with a flange at its lower end and threaded to receive an adjustable stop member 54 which cooperates with a stop yoke 56 having at its upper end an opening 58 through which extends the stem 28 and preferably also the upper end of the collar 52. The collar 52 is pinned to the stem 28 as shown at 60 and when the stop member 54 has been adjusted on the collar 52 to provide for the desired amount of normal opening movement of the stem 28, it is then preferably pinned in its adjusted stop position by a pin 62.

The yoke 56 is preferably held in its stop position by a ring 64, which may be of cast iron or other suitable material, the ring 64 being spaced from the narrow cylindrical enlargement 66 of the housing 2 by integral projections 68 preferably uniformly spaced about the part 66, the lower ends of the yoke 56 being provided with rectangular openings 70 adapted to fit over the projections 68 to hold the yoke in its stop position, the lower ends of the yoke being preferably also provided with lugs or projections 72 which engage beneath the lower edge of the ring 64. The ring 64 is preferably secured to the housing 2 by means of screws 74 threaded into the projections 68 on the housing 2 not engaged by the yoke 56.

The operation of the stop mechanism will readily be understood from the foregoing description: The parts having been adjusted to provide the desired amount of opening movement of the valve stem and pinned in their adjusted relation, it will be seen that the cone 22 can be moved only the adjusted distance up in the opening in the ring 12 and thus only a limited flow of water through the valve will be permitted. If, however, a fire occurs and the fire department desires to open the valve to its fullest extent, the ring 64 may readily be broken e. g., by a radial or transverse blow thus releasing the yoke 56 and permitting the valve to be opened wide. In order that the ring 64 may readily be broken it is preferably made of a brittle material such as cast metal, for example, cast iron or cast bronze.

It is to be understood of course that the stop mechanism as described above is merely a temporary or auxiliary stop, e. g., to prevent damage from high water pressure when it is not needed. This is in addition to the usual stop as provided in ordinary valve construction to prevent disassembling the valve by withdrawing the valve stem too far. In the present case this permanent stop is provided by the upper surface 80 of the nut 46 which abuts against the lower surface 81 of a boss on the interior of the housing 2.

What is claimed as new is:

1. A reducing valve comprising a housing having inlet and discharge openings therein, a valve member adapted to vary the effective size of one of said openings, a valve operating stem extending outside of said housing and a stop associated with said stem adapted normally to limit its movement, and including a member adapted to be broken to permit full opening of said valve in case of emergency, said stop comprising a yoke having spring metal fingers adapted to engage the valve housing and a collar of frangible metal adapted to hold said fingers in engaging relation to said valve, but adapted to be readily broken by a blow radial thereto.

2. A reducing valve comprising a casing having a fluid passage therethrough, a movable valve member adapted to close said passage and to be moved therein gradually to increase the effective opening therethrough so as to permit of gradually increased pressure of fluid at the outlet end of the passage, means for operating the valve member, a final stop adapted to limit maximum movement of the valve member in the opening direction and temporary stop means adapted to resist all attempts manually to force the valve beyond an extent less than its maximum opening and including a member readily frangible by a direct blow and adapted when broken to release said temporary stop so as to permit full opening of the valve.

3. A reducing valve comprising a casing having a fluid passage therethrough, a movable valve member adapted to close said passage and to be moved from its closing position gradually to open said passage so as to permit gradually increased fluid pressure to pass to the outlet end of said passage, means for operating the valve member, a final stop adapted to limit the maximum movement of the valve member in the opening direction, a removable stop adapted to limit movement of the valve member less than the maximum opening movement so as to permit passage of only a relatively low pressure and to resist all manual efforts to force further opening of the valve, means for holding said removable stop in said limiting position, and a frangible member adapted to hold said removable stop in operative engagement with said positioning means, to be broken by a direct blow whereby to permit removal of said stop and thereby to permit full opening of the valve.

4. In a combined hose and reducing valve, the combination with a valve housing having an inlet opening, a valve seat surrounding said opening, and a valve member, of means associated with the valve member for gradually varying the size of said opening as said valve member is moved away from its seat, a valve stem extending outside said housing, a stop member for limiting the maximum valve opening movement of said valve stem, a cooperating temporary stop member adapted to limit the movement of said valve stem to an extent less than the maximum valve opening movement so as to permit passage of fluid at only relatively low pressure and readily frangible means for holding said cooperating stop member directly connected with the housing to limit the normal opening movement of said valve.

JOHN H. DERBY.